Jan. 26, 1926.                                                  1,570,707
J. K. ROSS
VEGETABLE KNIFE
Filed July 25, 1924

Inventor.
J. K. Ross.
By
E.J. Fetherstonhaugh
Attorney.

Patented Jan. 26, 1926.

1,570,707

UNITED STATES PATENT OFFICE.

JOHN KING ROSS, OF FORT ERIE, ONTARIO, CANADA.

VEGETABLE KNIFE.

Application filed July 25, 1924. Serial No. 728,114.

*To all whom it may concern:*

Be it known that I, JOHN KING ROSS, a subject of the King of Great Britain, residing at Lavinia Street, in the town of Fort Erie, in the county of Welland, in the Province of Ontario and Dominion of Canada, have invented a new and useful Vegetable Knife, of which the following is a specification.

The invention relates to a vegetable knife as described in the present specification and illustrated in the accompanying drawings which form part of the same.

The invention consists essentially of the novel features pointed out broadly and specifically in the claims for novelty following a description containing an explanation in detail of an acceptable form of the invention.

The objects of the invention are to furnish a knife that will facilitate the operation in peeling potatoes and in removing the eyes and blemishes therefrom, to provide a knife that will be serviceable for all kinds of vegetables and fruit; to safeguard the fingers and be beneficial to the user and to eliminate as far as possible the present manner of peeling vegetables; and generally, to present to the public a knife that will be cheap to manufacture, durable in construction and efficient in use.

In the drawings, Figure 1 is a perspective view of the knife.

Like numerals of reference indicate corresponding parts in the various figures.

Figure 1:
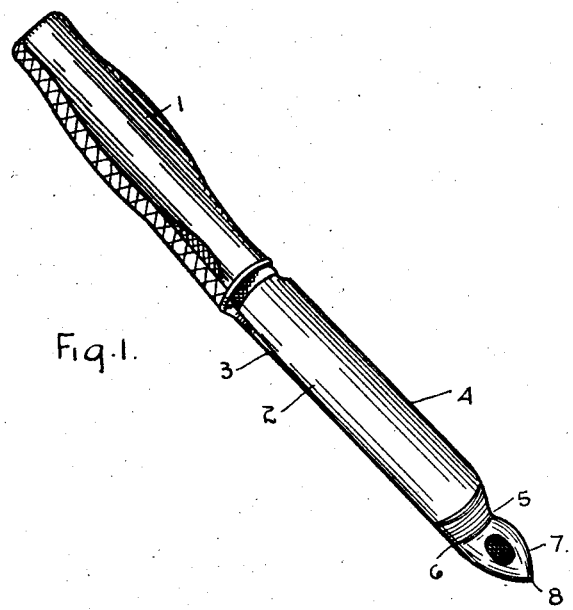
Figure 2:
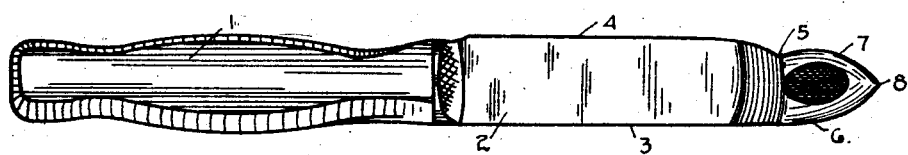
Figure 2 is a plan view of the knife.
Figure 3:
Figure 3 is a side elevation view of the knife.
Figure 4:
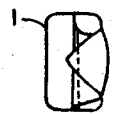
Figure 4 is an end view of the knife.
Figure 5:
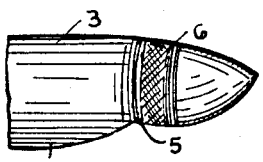
Figure 5 is a top plan view of the knife showing the main body broken away.

Referring to the drawings, the handle 1 of the knife blade 2 may be constructed of any suitable shape, the knife blade 2 being fastened thereto in a conventional manner.

The first portion of the blade 2 is formed in the usual way, having the back 3 on one side and a cutting edge 4 for peeling and trimming the vegetables.

This knife blade is drawn towards the point on the cutting edge side and forms a groove 5 while the back 3 at the same place projects upwardly at a slant 6. The groove in the knife cutting edge rises slightly upwards at 7 and then downwardly to a point 8 where it meets the slanting portion 5 of the back 3.

In the portion of the blade where the groove and slant is located, a distinct hollow is formed by the blade being bent inwardly at 9 and upwardly at 10 to the point 8.

In the use of this invention, the grooved portion and the recess form a means for eliminating the eyes, blemishes and any portion of the vegetable that is not required, in a safe and sanitary way, while the point of the blade is necessary for digging into the vegetables and opening the way for the other operations.

What I claim is:

A vegetable knife comprising a handle and a knife blade having a cutting edge and a dull edge and having a substantially spoon-shaped portion at one end thereof, one edge of said spoon-shaped portion having a groove situated substantially at a point where said spoon-shaped portion joins said knife blade.

In testimony whereof I have affixed my signature this 19th day of July, 1924 at the town of Fort Erie.

JOHN KING ROSS.